Patented Aug. 27, 1946

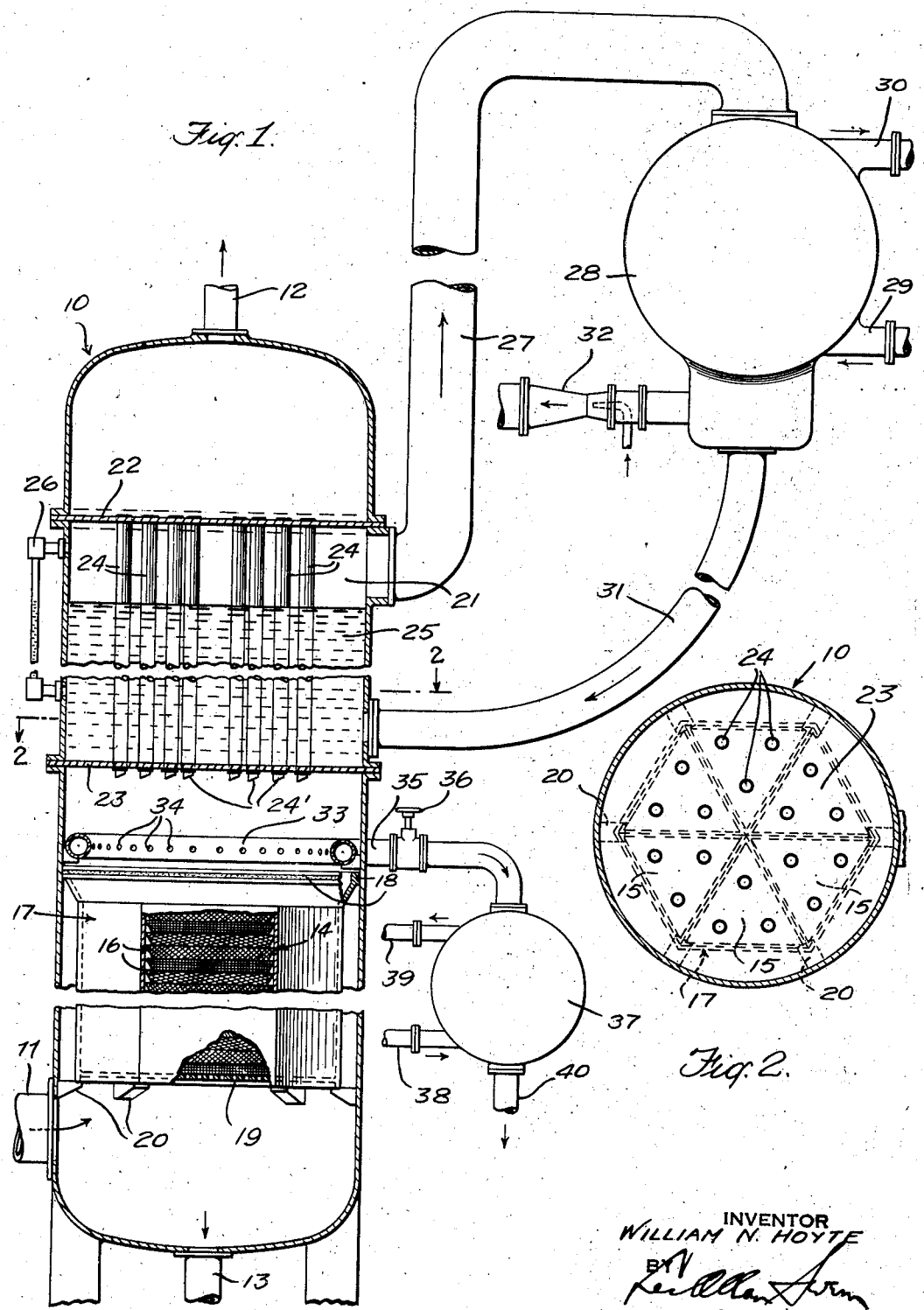

2,406,375

UNITED STATES PATENT OFFICE 2,406,375

FRACTIONATING COLUMN

William N. Hoyte, Rosebank, Staten Island, N. Y., assignor to Foster Wheeler Corporation, New York, N. Y., a corporation of New York Application December 11, 1942, Serial No. 468,670

9 Claims. (Cl. 202—161)

This invention relates to the fractional distillation of composite liquids such as hydrocarbon oils and the like, and more particularly pertains to the production and distribution of reflux in fractionating zones and apparatus.

The invention provides apparatus for the fractional distillation of composite liquids in which vapors, flowing from the zone in which vapor and liquid are brought into contact in fractionating apparatus, are condensed and are distributed substantially uniformly over the vapor and liquid contact devices at a controlled rate.

The invention will be understood from the following description when considered in connection with the accompanying drawing forming a part thereof, and in which:

Fig. 1 is a more or less diagrammatic view, in vertical section, of fractionating apparatus embodying and operating in accordance with the invention, and Fig. 2 is a transverse sectional view taken on line 2—2 of Fig. 1.

The invention will be disclosed as applied to a fractionating tower having vapor and liquid contacting means of the character disclosed in United States Stedman Patent No. 2,047,444, granted July 14, 1936, and in United States Bragg Patent No. 2,290,162, granted July 21, 1942, but it will be understood that the invention is not limited in its application to vapor and liquid contacting means of this type, but is capable of application generally to packed columns and to columns having other types of vapor and liquid contacting means.

Referring to the drawing, reference character 10 designates a fractionating column having a vapor, or a vapor and liquid inlet 11 in its lower portion, an outlet 12 for fixed gases at its upper portion, and an outlet 13 for liquid in its lower portion. Above the inlet 11, the column is provided with a packing, designated generally 14, of capillary material in the form of metal wire gauze provided with mesh openings which seal the liquid under treatment. The packing comprises a plurality of contiguous, equilateral triangular-shaped sections 15 arranged in the form of a hexagon, with each section consisting of a plurality of superposed equilateral triangular-shaped layers or units 16, all enclosed in a hexagonal-shaped casing 17 open at both ends. The casing 17 may be of any suitable construction for the purpose, but preferably it is made in sections detachably secured together and supported in the column. The upper end of the casing 17 is arranged to provide a seal 18 with the inner wall of the column. The packing may be of any suitable height in the column and is supported in any convenient manner, as by a grating 19 which is supported in the column by supports 20. It will be understood that the vapor to be fractionated flows upwardly through the packing counter-current to and in contact with reflux which flows downwardly through the packing from layer to layer.

Above the packing 14, the column is provided with a total vapor condenser in the form of a boiler 21 for a liquid boiling at a temperature below that of the condensing temperature of the vapors leaving the packing 14. The boiler 21 is in spaced relationship to the packing 14 thereby forming a vapor withdrawal zone between the packing and the boiler. As shown, the boiler 21 comprises an upper tube sheet 22, and a lower tube sheet 23 connected by a plurality of straight, vertically-extending open tubes 24 of relatively small diameter and having extensions 24' with bevelled lower ends, as shown. As indicated in Fig. 2, the tubes 24 are arranged so that the same number of tubes are disposed above each section 15 of the packing 14 in the column. More specifically, the tubes 24 are arranged so that three tubes are disposed above each triangular section of the packing, with each tube disposed adjacent, and inwardly of, each apex of the triangular section. The low boiling liquid or condensing medium indicated 25, is introduced into the boiler through a suitable connection, not shown, and fills the space between the tubes 24 and the column 10 to the desired level which may be observed by a gauge glass 26. Preferably, the liquid level in the boiler will be regulated to provide a space above the liquid for the liberation of vapor derived from the boiling liquid. The liquid 25 will be evaporated by heat transmitted to it from the vapors flowing through the tubes 24. Suitable heat insulation or other device, not shown, is applied to the external jacket around the boiler 21 so that the temperature of the liquid 25 will be substantially uniform across the boiler. The vapors of the low boiling liquid will flow through vapor line 27 to a suitable condenser 28, to which cooling liquid is supplied through a line 29 and is withdrawn through a line 30. Condensate is returned to the boiler through a condensate line 31. The condenser is provided with a steam jet ejector 32 for producing vacuum initially in the condenser, and for maintaining a vacuum should there be small air leaks during operation. The condenser preferably is located high enough with respect to the boiler to provide a sufficient liquid head in the line 31 to ensure the return of the condensate from condenser 28 to the bottom of the boiler.

Product is withdrawn from the tower in the form of a vapor, between the packing 14 and the boiler 21 through a collector ring 33 positioned in the withdrawal zone which ring has a plurality of apertures 34, and is conducted through a line 35 which is controlled by a valve 36 to a suitable condenser 37 to which cooling liquid is supplied through a line 38 and is withdrawn from a line 39. The product in liquid form, is conducted from the condenser through a line 40 to storage or a point of use. In order to obtain sharp fractionation there are preferably at least two such condensers 37 only one of which is in operation at any time. At suitable "cut points," one condenser is shut off and another condenser is brought into service.

Any suitable liquid which boils at a temperature below the condensing temperature of the vapors flowing to the boiler from the packing in the column may be employed as the condensing medium in the boiler. For the fractionation of composite liquids such as hydrocarbon oils and the like, water may be employed satisfactorily as the low boiling liquid. The boiling point of the liquid is adjusted by maintaining a constant pressure, possibly sub-atmospheric, on the condenser 28.

In operation, the vapor to be fractionated, passes upwardly through the packing 14 countercurrent to and in contact with reflux, and upon leaving the packing, flows upwardly into the tubes 24 of the boiler 21. Heat is transferred from the vapor in the tubes 24 to the low boiling liquid 25, in consequence of which the vapor in the tubes is condensed and the low boiling liquid is evaporated. The condensate in the tubes flows down the inner walls of the tubes 24 and the extensions 24', and falls onto the several sections of the packing 14 and flows downwardly over the packing as reflux. The vapor produced by the boiling of the liquid 25, flows through line 27 to the condenser 28, wherein the vapors are condensed, and the condensate returns to the boiler through line 31. Product in vapor form is withdrawn from the column through collector ring 33 and is condensed in the condenser 37, from which the condensate is withdrawn through line 40. The amount of reflux flowing down through the packing 14 will be controlled by the amount of product removed from the tower through the collector ring 33, which in turn is controlled by manipulation of valve 36. The temperature of the condensing medium 25 is controlled by varying the pressure maintained in the boiler and condenser system. Using water as the condensing medium and supplying the water to the boiler at 100° F., a vacuum of 27 in. may readily be maintained in the system so that the temperature of the boiler water in the boiler would be approximately 112° F. This temperature will be sufficiently low to condense oil vapors leaving the packing, although in some instances it may be necessary to maintain pressure above atmospheric in the column 10. Any degree of vacuum may be maintained so that the temperature of the condensing medium may be varied from approximately 112° F. to 212° F. at atmospheric pressure. The vacuum may be regulated by controlling the steam jet 32, or by varying the amount of cooling water used for the condenser 28, or by admitting a controlled amount of air to the condenser 28. Higher temperatures of the condensing medium may be obtained with pressures in the boiler in excess of atmospheric pressure.

With this arrangement and operation, heat is extracted substantially uniformly over the entire transverse area of the column from the vapors flowing upwardly from the packing, so that a substantially equal amount of condensate is formed in each tube 24, and equal distribution of the reflux is provided over the top of the packing as the vapors are condensed. The temperature of the condensing medium and the quantity of reflux supplied to the packing may be controlled readily, as previously described. Preferably, a clean liquid is utilized as the condensing medium so that fouling of the heating surface of the boiler is avoided. Inasmuch as the boiler and condenser system is a closed system, no pumps are required.

If desired, a steam jet booster may be employed at the outlet of boiler 21 and in line 27, to permit of a closer approach to the temperature of the cooling water in condenser 28.

Inasmuch as changes may be made in the form, location, relative arrangement and materials of the apparatus disclosed and the several parts thereof, it will be understood that the invention is not to be limited excepting by the scope of the appended claims.

What is claimed is:

1. Apparatus for fractionally distilling composite liquids comprising a fractionating column having an inlet, vapor and liquid contacting means in the column comprising packing of capillary material through which vapor of the liquid flows counter-current to reflux, said contacting means having a plurality of separate sections disposed adjacent each other in a horizontal plane, vapor condensing means in the column disposed above and in spaced relationship with said contacting means to form a chamber above and extending over said vapor and liquid contacting means, said condensing means having a plurality of vertically extending tubular members distributed substantially uniformly above said contacting means with an equal number of tubular members located above each of said sections and in communication with the chamber at one end of said members to receive vapor therefrom and return condensate thereto, a condensing medium on the outside of said tubular members having a boiling temperature below the condensing temperature of the vapor of the liquid, the arrangement being such that vapor of the liquid is condensed in said tubular members and the condensate flows downwardly through said chamber substantially uniformly onto the vapor and liquid contacting means as reflux and the condensing medium is vaporized, means for withdrawing vapor of the liquid from the column from the chamber between the contacting and the condensing means, means for controlling the quantity of vapor of the liquid withdrawn from the column to control the quantity of vapor condensed and returned to the contacting means as reflux, means for condensing vapor of the condensing medium, and means for returning condensate of the condensate medium to the condensing medium on the outside of said tubular members.

2. Apparatus for fractionally distilling composite liquids comprising a fractionating column having an inlet, vapor and liquid contacting means in the column comprising packing of capillary material through which vapor of the liquid flows counter-current to reflux, said contacting means having a plurality of separate sections disposed adjacent each other in a horizontal plane, vapor condensing means in the column disposed above and in spaced relationship with said contacting means to form a chamber above and extending over said vapor and liquid contacting means, said condensing means having a plurality of vertically extending tubular members distributed substantially uniformly above said contacting means with an equal number of tubular members located above each of said sections and in communication with the chamber at one end of said members to receive vapor therefrom and return condensate thereto, a condensing medium on the outside of said tubular members having a boiling temperature below the condensing temperature of the vapor of the liquid, the arrangement being such that vapor of the liquid is condensed in said tubular members and the condensate flows downwardly through said chamber substantially uniformly onto the vapor and liquid contacting means as reflux and the condensing medium is vaporized, means for withdrawing vapor of the liquid from the column from the chamber between the contacting and the condensing means, means for controlling the quantity of vapor of the liquid withdrawn from the column to control the quantity of vapor condensed and returned to the contacting means as reflux, means for maintaining sub-atmospheric pressure on the condensing medium in the column, means for condensing vapor of the condensing medium, and means for returning condensate of the condensate medium to the condensing medium on the outside of said tubular members.

3. Apparatus for fractionally distilling composite liquids comprising a fractionating column having an inlet, vapor and liquid contacting means in the column comprising packing of capillary material through which vapor of the fluid flows counter-current to reflux, said contacting means having a plurality of separate, contiguous, lateral triangular-shaped sections arranged in the form of a hexagon, each section consisting of a plurality of equilateral triangular-shaped layers disposed in superposed horizontal planes, vapor condensing means in the column disposed above and in spaced relationship with said contacting means to form a chamber above and extending over said vapor and liquid contacting means, said condensing means having a plurality of vertically extending tubular members distributed substantially uniformly above each section of said contacting means with an equal number of tubular members located above each of said sections and in communication with the chamber at one end of said members to receive vapor therefrom and return condensate thereto, a condensing medium on the outside of said tubular members having a boiling temperature below the condensing temperature of the vapor of the liquid, the arrangement being such that vapor of the liquid is condensed in said tubular members and the condensate flows downwardly through said chamber substantially uniformly onto the vapor and liquid contacting means as reflux, and means for withdrawing vapor of said liquid from the column between the contacting and condensing means.

4. Apparatus for fractionally distilling composite liquids comprising a fractionating column, packing in the column through which vapor of the fluid flows counter-current to and in contact with reflux, vapor condensing means in the column disposed above and in spaced relationship to said packing to form a chamber above and extending over the packing, said condensing means being in communication with said chamber through a plurality of openings through which openings vapor from the chamber enters the condensing means and condensate flows therefrom, said openings being arranged substantially uniformly above the packing so as to distribute the condensate substantially uniformly to said packing, the arrangement being such that vapor of the liquid is condensed in the condensing means and the condensate flows downwardly through said chamber and substantially uniformly onto the packing as reflux, and means for withdrawing vapor of said liquid from the column from the chamber.

5. Apparatus for fractionally distilling composite liquids comprising a fractionating column, packing in the column through which vapor of the fluid flows counter-current to and in contact with reflux, vapor condensing means in the column disposed above and in spaced relationship to said packing to form a chamber above and extending over the packing, said condensing means being in communication with said chamber through a plurality of openings through which openings vapor from the chamber enters the condensing means and condensate flows therefrom, said openings being arranged substantially uniformly above the packing so as to distribute the condensate substantially uniformly to said packing, the arrangement being such that vapor of the liquid is condensed in the condensing means and the condensate flows downwardly through said chamber and substantially uniformly onto the packing as reflux, means for withdrawing vapor of said liquid from the column from the chamber, and means for controlling the quantity of vapor of said liquid withdrawn from the column to control the quantity of vapor condensed and returned to the packing as reflux.

6. Apparatus for fractionally distilling composite liquids comprising a fractionating column, packing in the column through which vapor of the fluid flows counter-current to and in contact with reflux, vapor condensing means in the column disposed above and in spaced relationship to said packing to form a chamber above and extending over the packing, said condensing means having a condensing medium with a boiling temperature below the condensing temperature of the vapor and being in communication with said chamber through a plurality of openings through which openings vapor from the chamber enters the condensing means and condensate flows therefrom, said openings being arranged substantially uniformly above the packing so as to distribute the condensate substantially uniformly to said packing, the arrangement being such that vapor of the liquid is condensed in the condensing means and the condensate flows downwardly through said chamber and substantially uniformly onto the packing as reflux, means for withdrawing vapor of said liquid from the column from the chamber, means for condensing vapor of the condensing medium, and means for returning condensate of the condensing medium to the condensing medium in heat exchange relationship with the condensing surface.

7. Apparatus for fractionally distilling composite liquids comprising a fractionating column, packing in the column through which vapor of the fluid flows counter-current to and in contact with reflux, vapor condensing means in the column disposed above and in spaced relationship to said packing to form a chamber above and extending over the packing, said condensing means having a plurality of generally vertically extending tubular members distributed substantially uniformly above said packing, the tubular members being in communication at one end thereof with said chamber to receive vapor therefrom and return condensate thereto, a condensing medium outside of said tubular members and in indirect heat exchange relationship therewith the arrangement being such that vapor of the liquid is condensed in said tubular members and the condensate flows downwardly through said chamber substantially uniformly onto the packing as reflux, and means for withdrawing vapor of said liquid from the column from the chamber.

8. Apparatus for fractionally distilling composite liquids comprising a fractionating column having an inlet, vapor and liquid contacting means in the column through which vapor of the fluid flows counter-current to reflux, said vapor and liquid contacting means comprising capillary material, the capillary openings of which seal with liquid under treatment, arranged to provide a plurality of cells disposed in superposed relationship with adjacent cells in engagement, each cell extending throughout substantially the entire flow area of the device, vapor condensing means in the column disposed above and in spaced relationship with said contacting means to form a chamber above and extending over said vapor and liquid contacting means, said condensing means being in communication with said chamber through a plurality of openings through which openings vapor from the chamber enters the condensing means and condensate flows therefrom, said openings being arranged substantially uniformly above the packing so as to distribute the condensate substantially uniformly to said packing, the arrangement being such that vapor of the liquid is condensed in the condensing means and the condensate flows downwardly through said chamber and substantially uniformly onto the packing as reflux, and means for withdrawing vapor of said liquid from the column from the chamber.

9. Apparatus for fractionally distilling composite liquids comprising a fractionating column having an inlet, vapor and liquid contacting means in the column through which vapor of the fluid flows counter-current to reflux, said contacting means having a plurality of separate sections disposed adjacent each other in a horizontal plane, each section having a plurality of sides disposed so that the section may be placed contiguous to other like sections with contiguous sides of contiguous sections parallel, vapor condensing means in the column disposed above and in spaced relationship with said contacting means to form a chamber above and extending over said vapor and liquid contacting means, said condensing means having a plurality of vertically extending tubular members distributed substantially uniformly above each section of said contacting means, the arrangement being such that vapor of the liquid is condensed in the condensing means and the condensate flows downwardly through said chamber and substantially uniformly onto the packing as reflux, and means for withdrawing vapor of said liquid from the column from the chamber.

WILLIAM N. HOYTE.